April 18, 1961  G. R. FEASTER  2,980,819
THERMAL ENERGY CONVERTER
Filed July 1, 1958

WITNESSES:
Bernard R. Gieguey
James F. Young

INVENTOR
Gene R. Feaster
BY Homer O. Blair
ATTORNEY

United States Patent Office 2,980,819
Patented Apr. 18, 1961

2,980,819
THERMAL ENERGY CONVERTER

Gene R. Feaster, Horseheads, N.Y., assignor to Westinghouse Electric Corporation, East Pittsburgh, Pa., a corporation of Pennsylvania Filed July 1, 1958, Ser. No. 746,020

13 Claims. (Cl. 313—212)

This invention relates to devices for converting thermal energy into electrical energy and, more particularly, to thermionic diode energy converters.

It is found in many instances that it would be desirable to convert thermal energy directly into electrical energy. There have been various devices known in the prior art which have some application in this field but most of them have either low efficiency, are very expensive or are impractical for other reasons.

In general, this invention relates to a thermionic diode having a cathode which, when heated, will emit electrons which in turn will travel to an anode thereby transporting a current. If the cathode and the anode are connected to an electrical load, it will be found that electrical energy is available to perform work.

Therefore, it is an object of my invention to provide an improved energy converter for converting thermal energy into electrical energy.

It is another object of my invention to provide an improved thermionic diode energy converter for converting thermal energy into electrical energy.

It is a further object of my invention to provide an improved thermionic diode energy converter in which space charge is reduced or eliminated by alkali metal ions.

It is still another object to provide a thermionic diode energy converter in which space charge is reduced or eliminated due to the presence of an alkali metal vapor, which, upon becoming ionized, has the effect of reducing the space charge.

These and other objects of my invention will become apparent from the following description taken in accordance with the accompanying drawings which form a part of this application and, in which.

One of the primary limitations in the efficiency of thermionic diode energy converters is due to the presence of space charge between the cathode and anode.

In accordance with my invention, thermionic diode energy converters are made practical by reducing or substantially eliminating this undesirable space charge. If alkali metal vapors are allowed to come in contact with heated portions of a diode energy converter, the alkali metals will be positively ionized and these positive ions act to reduce or substantially eliminate the space charge thus allowing large quantities of electrons to pass from the cathode to the anode generating an electric current.

Figure 1:
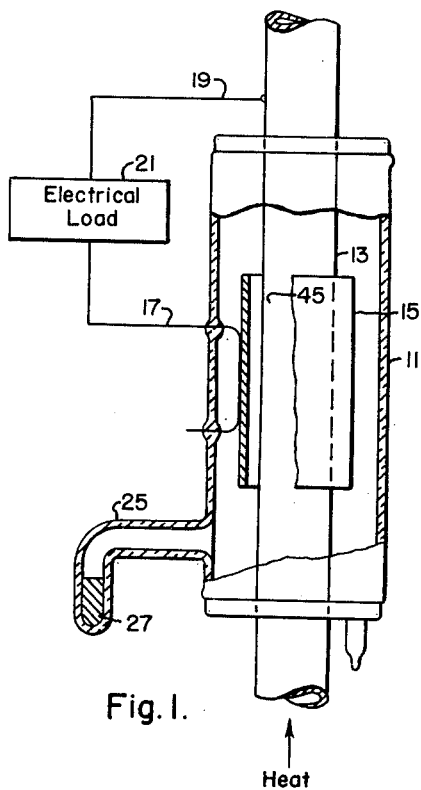
Figure 1 is a sectional schematic view of one embodiment of my invention.

In Fig. 1, there is shown a schematic view of one embodiment of my invention in which an evacuated envelope 11 encloses a cathode 13 and an anode 15. The envelope 11 may be made of either a suitable insulative or metallic material and, in this particular embodiment, the cathode extensions pass through the envelope 11 by means of a vacuum tight seal. The cathode 13 has an electron emissive surface 45. The anode 15 is closely spaced from the electron emissive surface 45 of the cathode 13. An electrical connection 17 is made to the anode 15, passes through the envelope 11 and connects to an electrical load 21. Also, the cathode connection 19 extends from an external portion of the cathode to the electrical load 21. In this particular embodiment, the envelope 11 has a side arm 25 which contains a source 27 of alkali metal which, upon heating, will liberate alkali metal vapors which will pass into the envelope and will at least partially be located between the cathode 13 and the anode 15. The envelope 11 has been previously evacuated and thus the alkali metal vapor is the only gaseous material within the envelope 11 and between the cathode 13 and the anode 15. The source 27 may be the alkali metal itself or a suitable alkali metal compound such as cesium dichromate mixed with a suitable reducing agent such as silicon which, upon being heated, liberates cesium.

I have found that the alkali metals lithium (5.36 volts); sodium (5.11 volts); potassium (4.33 volts); rubidium (4.13 volts); and cesium (3.86 volts) are suitable for use in this invention. The above figures within the parentheses refer to the ionization potential of the respective materials. The cathode 13 may be made of a number of materials, but it is important that the emissive surface be of a material that can stand temperatures that will produce substantial thermionic emission during operation of the device. The electron emissive surface must be at least 1000° C. during operation, although in most instances it is desirable if the emissive surface has a sufficiently high melting point and a low vapor pressure to permit operation at a temperature of about 1500° C.

Also, the work function of the material of the cathode emissive surface must be higher than the ionization potential of the alkali metal used. For example, if cesium is used as the alkali member, a suitable cathode may be chosen from the following metals: tantalum (2996° C.; 4.07); zirconium (1750° C.; 4.13); rhenium (3167° C.; 5.1); wolfram (tungsten) (3410° C.; 4.54); molybdenum (2620° C.; 4.3); platinum (1773° C.; 6.3); rhodium (1966° C.; 4.8); palladium (1555° C.; 5.0); osmium (2700° C.; 4.7); iridium (2454° C.; 4.6); and columbium (2415° C.; 4.0). The figures in the parentheses after the above metals refer to the melting point and the work function in volts, respectively.

As is true of all the materials used which are exposed to the alkali metal vapor, the anode 15 must be made of a material which is substantially unreactive with the alkali metal used. The anode material also must be sufficiently refractory to withstand the temperature of operation which, in general, will be a few hundred degrees below the temperature of the cathode 13. The temperature of the anode 15 must be below the temperature of the cathode 13 during operation as thermionic diode energy converters will not function if the cathode 13 and the anode 15 are at the same temperature. With certain limitations, it may be stated that the greater the temperature differential between the cathode 13 and the anode 15 the more efficiently the device will operate until this differential becomes so great that other undesirable effects occur. To provide a suitable temperature differential, the anode 15 may be cooled by radiation fins, liquid cooling or other suitable means, if desired.

With respect to work function, there is no restriction on the choice of anode material and if desired, the anode 15 may be composed of the same material as the cathode. However, I have found that it is desirable in a thermionic diode energy converter to have the work function of the anode 15 automatically become as low as possible during operation. To obtain this desired state, I have found that when the anode 15 is exposed to the alkali metal vapors, a film is formed on the anode 15 which reduces the work function of the anode 15, which materially increases the voltage output of the device. If, for example, the cathode work function is two electron volts and the anode work function is one electron volt, it is possible to have an output voltage numerically equal to the difference between these two work functions even when the diode is operating into a load resistance properly chosen to provide maximum power output. By comparison in a diode whose anode work function is equal to or greater than the cathode work function, the available voltage is only $$\frac{T\ (^\circ K.)}{11,600}$$

volts under optimum power transfer loading conditions. In this case, for a cathode temperature as high as 2000° K., one obtains only 0.172 volt output. Thus it is seen that it is very desirable to reduce the work function of the anode 15 during operation and that this is done automatically by the alkali metal film formed thereon as described above.

When the cathode 13 is heated to a sufficiently high temperature, electrons will be emitted from the cathode 13 and will travel to the anode 15. These electrons will carry current from the cathode 13 to the anode 15 and through a suitable external circuit from which electrical energy may be obtained.

However, it has been found that a cloud of electrons will form around the cathode 13 and this cloud has a negative charge, known as space charge. This space charge, being negative, tends to repel the electrons emitted from the cathode 13 and to prevent these emitted electrons from penetrating the electron cloud, thereby reducing the number of electrons reaching the anode 15, which, of course, reduces the electrical energy available from the device. If this space charge can be eliminated or reduced, usable amounts of electrical energy become available.

It is found that the alkali metal atoms in the vapor will become ionized when in contact with a hot material having a work function greater than the ionizing potential of the alkali metal. This is known as contact ionization. Therefore, if hot metal parts of the cathode structure or metal parts which are attached to the cathode are exposed to the alkali metal vapors, the vapor will be positively ionized on contact and the ions will move to the region of the space charge potential minimum, that is, the region with the greatest negative charge. It can be seen that it is important to provide a large pressure of alkali metal vapor to produce a sufficient number of alkali metal ions to reduce the space charge. Since the vapor pressure in the device is determined by the temperature of the coldest surface to which the alkali metal vapor has access, it is desirable to operate the device in a hot ambient. I have found that good results may be obtained when a device containing cesium vapor is maintained at an ambient temperature of approximately 150° C. or above, that is, the portions of the device to which the alkali metal vapor is exposed, should be at least 150° C. At the temperature of 250° C. the vapor pressure of cesium is found to be about 0.5 mm. of mercury which gives excellent results. However, this pressure should not become too large or the flow of electrons from the cathode 13 to the anode 15 will be impeded. I have found that satisfactory results may be obtained with cesium if the vapor pressure is kept between 0.01 and 20 mm. of mercury.

Since a thermionic diode energy converter will not convert all of the supplied heat energy to electrical energy, the waste heat can be used, if desired, to maintain the alkali metal vapor pressure by use of a thermally insulating enclosure which tends to keep the device at an elevated temperature.

As shown in Fig. 1, heat may be supplied to the interior of the cathode 13 as indicated by the arrow. This heat may be in the form of a suitable flame, such as a gasoline flame, or some hot fluid, such as that from a nuclear reactor, may be passed through the cathode 13.

Figure 2:
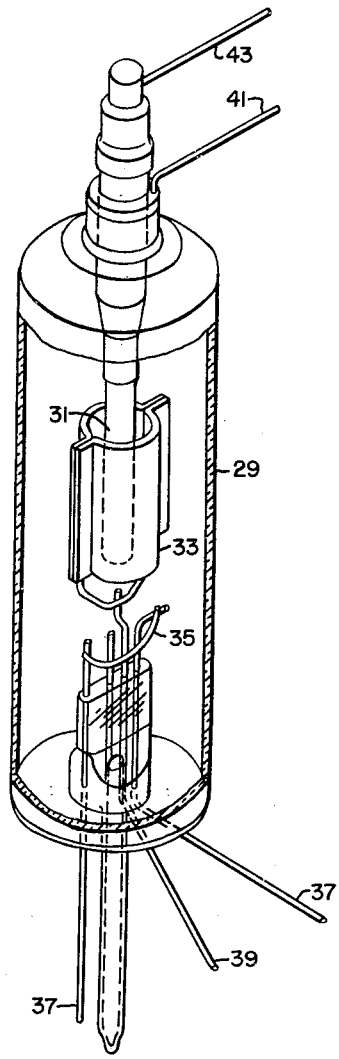
Fig. 2 is a perspective view of another embodiment of my invention in which portions of the envelope have been removed for reasons of clarity.

In Fig. 2, there is shown a particular embodiment of my invention which illustrates that the principles involved are workable. An envelope 29 encloses a cathode 31 which is closely spaced from an anode 33. A source 35 of alkali metal is positioned between two supports which are attached to alkali metal source leads 37. When current is passed through the alkali metal source leads 37, the alkali metal will be vaporized from the source 35. Also shown are an anode lead 39, a combination cathode-heater lead 41 and a heater lead 43. As can be seen in Fig. 2, electricity is used to form heat which, in turn, is converted into electricity which, while the apparatus may not be a commercial embodiment, does illustrate the principle that heat may be converted into electricity although, as a practical matter, it may be desirable to obtain the heat from sources other than the electricity itself.

I have used a cylindrical diode having a cathode 31 made of tungsten with an emissive area of two square centimeters. Also, a closely spaced molybdenum anode 33 has been used in a cesium vapor atmosphere. At a cathode temperature of approximately 1500° C. and an ambient temperature of 250° C., a current of 300 milliamperes at a potential of one volt is available from the anode 33. The fact that the output voltage is of the order of one volt is rather surprising until one considers that the cesium coats the molybdenum anode 33, which is at a lower temperature than the cathode 31, and therefore lowers the work function of the anode 33 relative to the cathode 31.

In this specific example given, it should be noted that the tungsten cathode has a work function of 4.54 volts and the molybdenum anode has a work function of 4.3 volts which, during operation, is reduced by the formation of a thin film of cesium.

Thus, my invention results in a thermionic diode energy converter which is easy to construct, is inexpensive, and, by the use of alkali metal vapor, efficiently converts readily obtainable thermal energy into reasonable amounts of electrical energy.

While this invention has been shown in a few forms only, it is obvious that other modifications may be made without departing from the spirit and scope thereof.

I claim as my invention:

1. A thermionic device for converting thermal energy into electrical energy including an envelope, a cathode, a source of thermal energy for supplying heat to said cathode, an anode and alkali metal vapor located at least partially between said cathode and said anode during operation, said cathode having an electron emissive surface portion having a work function greater than the ionization potential of said alkali metal, said electron emissive surface, during operation, being at a temperature adequate to produce substantial thermionic emission and being at a higher temperature than said anode.

2. A thermionic device for converting thermal energy into electrical energy including an envelope, a cathode, a source of thermal energy for supplying heat to said cathode, an anode and alkali metal vapor located at least partially between said cathode and said anode during operation, said cathode having an electron emissive surface having a work function greater than the ionization potential of said alkali metal, said electron emissive surface, during operation, being at a temperature of at least 1000° C., said anode being at a temperature below 1000° C.

3. A thermionic device for converting thermal energy into electrical energy including an envelope, a cathode, a source of thermal energy for supplying heat to said cathode, an anode and alkali metal vapor located at least partially between said cathode and said anode during operation, said cathode having an electron emissive surface having a work function greater than the ionization potential of said alkali metal, said electron emissive surface, during operation, being at a temperature adequate to produce substantial thermionic emission and being at a higher temperature than said anode, said electron emissive surface work function being higher than the work function of said anode during operation.

4. A thermionic device for converting thermal energy into electrical energy including an envelope, a cathode, a source of thermal energy for supplying heat to said cathode, an anode and alkali metal vapor located at least partially between said cathode and said anode during opertion, said cathode having an electron emissive surface having a work function greater than the ionization potential of said alkali metal, said electron emissive surface, during operation, being at a temperature of at least 1000° C., said anode being at a temperature below 1000° C., said electron emissive surface work function being higher than the work function of said anode during operation.

5. A thermionic device for converting thermal energy into electrical energy including an envelope, a cathode, a source of thermal energy for supplying heat to said cathode, an anode and alkali metal vapor located at least partially between said cathode and said anode during operation, said alkali metal being selected from the group consisting of lithium, sodium, potassium, rubidium, and cesium, said cathode having an electron emissive surface having a work function greater than the ionization potential of said alkali metal, said electron emissive surface, during operation, being at a temperature adequate to produce substantial thermionic emission and being at a higher temperature than said anode.

6. A thermionic device for converting thermal energy into electrical energy including an envelope, a cathode, a source of thermal energy for supplying heat to said cathode, an anode and cesium vapor located at least partially between said cathode and said anode during operation, said cathode having an electron emissive surface having a work function greater than the ionization potential of cesium, said electron emissive surface, during operation, being at a temperature adequate to produce substantial thermionic emission and being at a higher temperature than said anode.

7. A thermionic device for converting thermal energy into electrical energy including an envelope, a cathode, a source of thermal energy for supplying heat to said cathode, an anode and cesium vapor located at least partially between said cathode and said anode during operation, said cathode having an electron emissive surface having a work function greater than the ionization potential of cesium, said electron emissive surface, during operation, being at a temperature adequate to produce substantial thermionic emission and being at a higher temperature than said anode, said cesium vapor pressure, during operation, being between 0.01 and 20 mm. of mercury.

8. A thermionic device for converting thermal energy into electrical energy including an envelope, a cathode, a source of thermal energy for supplying heat to said cathode, an anode and cesium vapor located at least partially between said cathode and said anode during operation, said cathode having an electron emissive surface having a work function greater than the ionization potential of cesium, said electron emissive surface, during operation, being at a temperature of at least 1000° C., said anode being at a temperature below 1000° C., said cesium vapor pressure, during operation, being between 0.01 and 20 mm. of mercury.

9. A thermionic device for converting thermal energy into electrical energy including an envelope, a cathode, a source of thermal energy for supplying heat to said cathode, an anode and cesium vapor located at least partially between said cathode and said anode during operation, said cathode having an electron emissive surface having a work function greater than the ionization potential of cesium, said electron emissive surface, during operation, being at a temperature adequate to produce substantial thermionic emission and being at a higher temperature than said anode, said emissive surface being substantially composed of a metal selected from the group consisting of tantalum, zirconium, rhenium, tungsten, molybdenum, platinum, rhodium, palladium, osmium, iridium and columbium.

10. A thermionic device for converting thermal energy into electrical energy including an envelope, a cathode, a source of thermal energy for supplying heat to said cathode, an anode and alkali metal vapor located at least partially between said cathode and said anode during operation, said cathode having an electron emissive surface having a work function greater than the ionization potential of said alkali metal, said electron emissive surface, during operation, being at a temperature adequate to produce substantial thermionic emission and being at a higher temperature than said anode, said electron emissive surface work function being higher than the work function of said anode during operation, portions of said envelope, said cathode and said anode being exposed to said alkali metal vapor, said exposed portions being substantially unreactive with respect to said alkali metal.

11. A thermionic device for converting thermal energy into electrical energy including an envelope, a cathode, a source of thermal energy for supplying heat to said cathode, an anode and alkali metal vapor located at least partially between said cathode and said anode during operation, said cathode having an electron emissive surface having a work function greater than the ionization potential of said alkali metal, said electron emissive surface, during operation, being at a temperature adequate to produce substantial thermionic emission and being at a higher temperature than said anode, said electron emissive surface work function being higher than the work function of said anode during operation, portions of said envelope, said cathode and said anode being exposed to said alkali metal vapor, said exposed portions being at a temperature above 150° C. during operation.

12. A thermionic device for converting thermal energy into electrical energy including an envelope, a cathode, a source of thermal energy for supplying heat to said cathode, an anode and alkali metal vapor located at least partially between said cathode and said anode during operation, said cathode having an electron emissive surface having a work function greater than the ionization potential of said alkali metal, said electron emissive surface, during operation, being at a temperature adequate to produce substantial thermionic emission and being at a higher temperature than said anode, said alkali metal vapor being operable to coat portions of said anode with alkali metal thereby reducing the work function of said anode.

13. A thermionic device for converting thermal energy into electrical energy including an envelope, a cathode, a source of thermal energy for supplying heat to said cathode, an anode and alkali metal vapor located at least partially between said cathode and said anode during operation, said cathode having an electron emissive surface having a work function greater than the ionization potential of said alkali metal, said electron emissive surface during operation, being at a temperature adequate to produce substantial thermionic emission and being at a higher temperature than said anode, portions of said cathode being operable to ionize said alkali metal vapor on contact during operation thereby forming alkali metal ions, said alkali metal ions being operable to reduce space charge.

References Cited in the file of this patent

UNITED STATES PATENTS

| | | |
|---|---|---|
| 1,976,385 | Bruijnes et al. | Oct. 9, 1934 |
| 2,042,261 | Krefft | May 26, 1936 |
| 2,106,855 | Pearcy | Feb. 1, 1938 |

FOREIGN PATENTS

| | | |
|---|---|---|
| 229,019 | Great Britain | Feb. 19, 1925 |